(12) United States Patent
Kawazu et al.

(10) Patent No.: US 7,700,676 B2
(45) Date of Patent: Apr. 20, 2010

(54) WATER-BASED ONE-PACK-TYPE COATING COMPOSITION AND COATED ARTICLE

(75) Inventors: Kenji Kawazu, Toyota (JP); Kentaro Komabayashi, Toyota (JP); Naoya Yabuuchi, Hirakata (JP); Shinnosuke Kawano, Hirakata (JP); Hirofumi Yamashita, Hirakata (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/158,199

(22) PCT Filed: Dec. 19, 2006

(86) PCT No.: PCT/JP2006/325298

§ 371 (c)(1),
(2), (4) Date: Jun. 19, 2008

(87) PCT Pub. No.: WO2007/072830

PCT Pub. Date: Jun. 28, 2007

(65) Prior Publication Data

US 2009/0048378 A1    Feb. 19, 2009

(30) Foreign Application Priority Data

Dec. 20, 2005  (JP) .............................. 2005-367062

(51) Int. Cl.
*C08G 18/28* (2006.01)
*C08K 5/06* (2006.01)

(52) U.S. Cl. ...................................... 524/198; 524/378
(58) Field of Classification Search .................. 524/198
See application file for complete search history.

(56) References Cited

U.S. PATENT DOCUMENTS

| 5,767,188 | A | 6/1998 | Kamikuri et al. |
| 2003/0212191 | A1 | 11/2003 | Nakaoka et al. |
| 2005/0123770 | A1 | 6/2005 | Kawazu et al. |
| 2005/0222324 | A1* | 10/2005 | Nakaoka et al. ............ 524/589 |
| 2006/0052493 | A1 | 3/2006 | Nagano et al. |

FOREIGN PATENT DOCUMENTS

| JP | 2003-212947 | 7/2003 |
| JP | 2004 002801 | 1/2004 |
| JP | 2004-155883 | 6/2004 |
| JP | 2004 155883 | 6/2004 |
| JP | 2004-285341 | 10/2004 |
| JP | 2004 285341 | 10/2004 |
| JP | 2005 139273 | 6/2005 |
| JP | 2005-139273 | 6/2005 |

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

It is an object of the present invention to provide a water-based one-pack-type coating composition which can form a coating film having a satisfactory feel of achieving a soft feel and coating film performance simultaneously and further maintains common performance of paint such as excellent design (a matt appearance, etc.), an adhesion property, coating film strength, abrasion resistance, water resistance, oil and grease-contamination resistance. A water-based one-pack-type coating composition of the present invention comprises: an ionomer resin emulsion (A), a polyolefin resin emulsion (B), resin particles (C), and a urethane dispersion (D), wherein a solid content mass ratio (mass ratio as converted into a solid content) of (C)/{(A)+(B)+(D)} is 40/100 to 100/100, a solid content mass ratio of (A)/(B) is 1/3 to 3/1, and a solid content mass ratio of {(A)+(B)}/(D) is 40/60 to 70/30.

14 Claims, No Drawings

WATER-BASED ONE-PACK-TYPE COATING COMPOSITION AND COATED ARTICLE

TECHNICAL FIELD

The present invention relates to a water-based one-pack-type coating composition and a coated article.

BACKGROUND ART

Paints for automotive interior parts such as instrument panels, center consoles, and door trims, light electrical appliance parts such as housings of radio-cassette tape recorders and computers, or building interior materials such as wall materials, floor materials, and ceiling materials are required to have a dignified appearance and a luxurious appearance, and therefore matt paints are applied. Such a matt paint applied to plastics is not suitable for treatment at a high temperature, and a two-component solvent paint, in which a base agent and a curing agent are mixed immediately before use, has been generally used (for example, refer to Parent Documents 1 to 3).

However, in the field of paint, an one-component paint which does not require work to mix two components is desired in order to simplify processes. Further, the conversion to a water-based type is broadly desired in order to reduce environmental burden. Accordingly, it is desired to also convert the paint described above to a water-based one-pack-type paint. However, studies on the conversion to the water-based one-pack-type in such a field have not been adequately made.

When the conversion to a water-based one-pack-type is realized, it is required to maintain various properties required for the paint described above. Examples of such properties include common performance of paint such as excellent design (a matt appearance, etc.), an adhesion property, coating film strength, abrasion resistance, water resistance, oil and grease-contamination resistance, and alkali resistance. Furthermore, since coating films formed from these paints are often directly touched with fingers during their use, it is desired that the coating films have a soft feel (feel of high quality of achieving adequately an elastic feel and coating film hardness, and a smooth feel and a moist feel simultaneously). It is difficult to form a coating film so as to satisfy all these properties and a water-based one-pack-type paint having all these properties has not been known.

Patent Document 1: Japanese Kokai Publication 2005-139273

Patent Document 2: Japanese Kokai Publication 2004-285341

Patent Document 3: Japanese Kokai Publication 2004-155883

DISCLOSURE OF THE INVENTION

Problems to be Solved by the Invention

In view of the above, it is an object of the present invention to provide: a water-based one-pack-type coating composition which can form a coating film having a satisfactory feel of achieving a soft feel and coating film performance simultaneously and further maintains common performance of paint such as excellent design (a matt appearance, etc.), an adhesion property, coating film strength, abrasion resistance, water resistance, oil and grease-contamination resistance, and alkali resistance; and a coated article coated with such a water-based one-pack-type coating composition.

Means for Solving the Problems

The present invention is a water-based one-pack-type coating composition comprising: an ionomer resin emulsion (A) a polyolefin resin emulsion (B), resin particles (C), and a urethane dispersion (D), wherein a solid content mass ratio (mass ratio as converted into a solid content) of (C)/{(A)+(B)+(D)} is 40/100 to 100/100, a solid content mass ratio of (A)/(B) is 1/3 to 3/1, and a solid content mass ratio of {(A)+(B)}/(D) is 40/60 to 70/30.

The ionomer resin emulsion (A) preferably has a glass transition temperature (Tg) of −40 to 20° C.

The polyolefin resin emulsion (B) preferably comprises at least one of an acid anhydride modified chlorinated polyolefin and an acid anhydride modified nonchlorinated polyolefin.

The resin particles (C) preferably have a number average particle diameter of 2 to 40 μm, as measured using a laser diffraction-type particle size distribution measuring apparatus.

The coating film is preferably formed from the aforementioned water-based one-pack-type coating composition.

Hereinafter, the present invention will be described in detail.

The water-based one-pack-type coating composition of the present invention is suitable for coating of automotive interior parts such as instrument panels, center consoles, and door trims, light electrical appliance parts such as housings of radio-cassette tape recorders and computers, and building interior materials such as wall materials, floor materials, and ceiling materials.

By containing the ionomer resin emulsion (A), the polyolefin resin emulsion (B), the resin particle (C) and the urethane dispersion (D), the water-based one-pack-type coating composition of the present invention has feel of high quality of achieving adequately a soft feel and coating film performance simultaneously and maintains common performance of paint such as excellent design (a matt appearance etc.), an adhesion property, coating film strength, abrasion resistance, water resistance, oil and grease-contamination resistance and alkali resistance although it is the one-component paint which is easy to handle compared with a two-component paint.

The water-based one-pack-type coating composition of the present invention contains the ionomer resin emulsion (A). The ionomer resin emulsion (A) is a component which is dissolved by heat-flow to form a matrix. By containing the ionomer resin emulsion (A), particularly, oil and grease-contamination resistance and alkali resistance can be enhanced in a coating film to be formed. It is conceivable that although the paint is a water-based one-pack-type lacquer paint, the oil and grease-contamination resistance and the alkali resistance can be secured due to the crosslinking structure of an ionomer resin. Further, by adjusting the glass transition temperature of the ionomer resin emulsion (A), the soft feel of a coating film to be formed can be enhanced. The reason for this is presumably that the ionomer resin has strong interaction between high molecules and has rubber elastic characteristics. Further, the ionomer resin has excellent physical strength and therefore is superior in coating film strength and abrasion resistance.

The ionomer resin emulsion (A) is an emulsion formed of a resin having an intermolecular bond by metal ions, and examples of the resin emulsion include: an acrylic resin having a structure, in which an acid group in the resin is crosslinked through a metal ion; and the like. The acid group is preferably a carboxyl group. Examples of the metal can include zinc, magnesium, calcium, aluminum, and the like.

The ionomer resin emulsion (A) is not particularly limited, and examples of the ionomer resin emulsion (A) can include: a resin emulsion obtained by emulsification polymerization of a monomer composition including a metal salt of an acid group-containing vinyl monomer and another vinyl monomer; a resin emulsion obtained by emulsification of a resin obtained by solution polymerization of the monomer composition; and the like. Examples of the metal salt of an acid group-containing vinyl monomer can include compounds expressed by the formula $MA_x$ (M represents metal elements such as zinc, magnesium, calcium, and aluminum, X represents the valence of M, and As are the same or different and each of the As represents an organic acid residue chain having an unsaturated group).

The organic acid residue is preferably an aliphatic, aromatic, or alicyclic carboxylic acid, having a carbon-carbon double bond, a carboxyl group, and 3 to 14 carbon atoms. Furthermore, the organic acid residue may have an ester bond, an ether bond, or the like.

More specific examples of the organic acid residue include organic residues of acrylic acid, methacrylic acid, maleic acid, itaconic acid, organic acids represented by the following formula (1);

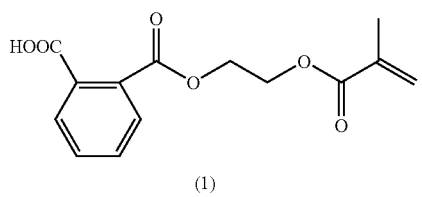

[Formula 1]

(1)

or the following formula (2);

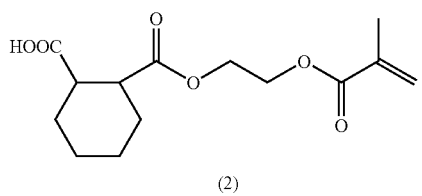

[Formula 2]

(2)

Examples of commercially available products of the metal salt of acid group-containing vinyl monomer include SR708, SR705, 2404, CN2405, and the like, produced by Sartomer Company, Inc. Two or more species of these compounds may be used in combination.

The other copolymerizable vinyl monomer is not particularly limited, and examples of the vinyl monomer include (meth) acrylic esters such as methyl acrylate, ethyl acrylate, propyl acrylate, butyl acrylate, methyl methacrylate, ethyl methacrylate, propyl methacrylate, and butyl methacrylate; unsaturated carboxylic acids such as (meth) acrylic acid, maleic acid, fumaric acid, citraconic acid, and itaconic acid; styrene; and the like. Two or more species of these compounds may be used in combination.

The content of the metal salt of the acid group-containing vinyl monomer (i.e., a weight of the metal salt of the acid group-containing vinyl monomer to the monomer composition) is preferably 20 to 50% by weight. The content of less than 20% by weight may cause poor oil and grease-contamination resistance and alkali resistance, and the content of more than 50% by weight may cause a poor film formation property. The content of the metal salt of the acid group-containing vinyl monomer is more preferably 10 to 40% by weight.

The ionomer resin emulsion (A) preferably has a glass transition temperature (Tg) of −40 to 20° C. The glass transition temperature of less than −40° C. may make it impossible to adequately attain film properties such as abrasion resistance, oil and grease-contamination resistance, and alkali resistance, and the glass transition temperature of more than 20° C. may make it impossible to attain the soft feel. The Tg is more preferably −20 to 10° C. In the present specification, Tg is measured using a differential scanning calorimeter (DSC) (thermal analyzer SSC 5200H manufactured by Seiko Instruments Inc.) after distilling off a solvent of the obtained emulsion under reduced pressure.

The ionomer resin emulsion (A) preferably has a number average particle diameter of 20 to 400 nm. The number average particle diameter of less than 20 nm may deteriorate the moisture resistance of a coating film because a large amount of emulsifier is used in producing the resin emulsion; whereas the number average particle diameter of more than 400 nm may make it impossible to attain an adequate film formation property. The number average particle diameter is more preferably 40 to 200 nm. The number average particle diameter of the ionomer resin emulsion (A) is measured using a dynamic light scattering method.

The water-based one-pack-type coating composition of the present invention contains the polyolefin resin emulsion (B). By containing the polyolefin resin emulsion (B), an adhesion property between a coating film and a base material can be enhanced. The reason for this is presumably that since the polyolefin resin emulsion (B) has a low solubility parameter, it tends to be distributed unevenly toward the base material side when the polyolefin resin emulsion (B) is mixed with the ionomer resin emulsion (A) and the urethane dispersion (D).

The polyolefin resin emulsion (B) preferably comprises at least one selected from the group consisting of an acid anhydride modified chlorinated polyolefin resin emulsion and an acid anhydride modified nonchlorinated polyolefin resin emulsion. The acid anhydride modified chlorinated polyolefin resin emulsion is an acid anhydride modified chlorinated resin emulsion formed of polyolefin substituted with a chlorine atom, and examples of this resin emulsion include substances described in Japanese Kokai Publication 2005-89647. The acid anhydride modified nonchlorinated polyolefin resin emulsion is a resin emulsion formed of polyolefin, which is composed of groups derived from acid anhydrides such as maleic anhydride, citraconic anhydride, and itaconic anhydride, has a modified portion obtained by grafting, and does not contain chlorine. As the polyolefin resin emulsion (B), commercially available products may also be used, and examples of the commercially available products include SA-1200 (produced by UNITIKA, Ltd.), SB-1200 (produced by UNITIKA, Ltd.), SE-1200 (produced by UNITIKA, Ltd.), and Auroren 100 (produced by NIPPON PAPER CHEMICALS Co., Ltd.).

The weight average molecular weight of the polyolefin resin emulsion (B) is preferably 50000 to 110000. The weight average molecular weight of less than 50000 may deteriorate the oil and grease-contamination resistance, and the weight average molecular weight of more than 110000 may deteriorate the adhesion property. The weight average molecular weight is more preferably 75000 to 105000. Here, the weight average molecular refers to a value determined according to a GPC method using a styrene polymer as a standard.

The acid anhydride modified chlorinated polyolefin preferably has a chlorination degree of 15 to 25%. The chlorination degree of less than 15% may deteriorate the adhesion to materials, and the chlorination degree of more than 25% may deteriorate the oil and grease resistance. The chlorination degree refers to a mass ratio (part by mass) of chlorine in the acid anhydride modified chlorinated polyolefin to the acid anhydride modified chlorinated polyolefin.

A solvent may be contained in the polyolefin resin emulsion (B) in an amount of 1 to 10 parts by mass with respect to 100 parts by mass (resin solid content) of the polyolefin resin emulsion (B). The solvent is not particularly limited, and examples of the solvent include aromatic hydrocarbons such as toluene, and xylene, and alicyclic hydrocarbons such as tetrahydrofurane.

In the water-based one-pack-type coating composition of the present invention, the solid content mass ratio of (A)/(B) is 1/3 to 3/1. The solid content mass ratio of (A)/(B) of less than 1/3 may deteriorate the coating film properties such as water resistance, alkali resistance, oil and grease resistance, and abrasion resistance, and the (A)/(B) of more than 3/1 may deteriorate the water resistance and alkali resistance. The (A)/(B) is more preferably 1.2/3 to 2.7/1.

The water-based one-pack-type coating composition of the present invention contains the resin particles (C). The resin particles (C) are resins having a high melting point or not having a melting point, and particles made of organic resins not having miscibility with the above (A) and (B). Since the resin particles (C) do not completely lose their shape after formation of a coating film, projections and depressions are formed on the surface of the coating film, and therefore by containing the resin particles (C), a coating composition, which can form a coating film having an excellent smooth feel and matt appearance, can be obtained.

The resin particles (C) preferably comprise at least one selected from the group consisting of an acrylic resin, a urethane resin, an epoxy resin, and a nylon resin; and the acrylic resin and/or the urethane resin are/is more preferable. Further, the species of the resin particles (C) is not limited to any one of colored particles, colorless particles, transparent particles, and opaque particles; and any species of these particles can be used in conformity with aimed design. Usable resin particles are not particularly limited, and commercially available resin particles are utilizable.

The resin particles (C) preferably have a number average particle diameter of 2 to 40 μm. The number average particle diameter of less than 2 μm may deteriorate the matt appearance and the smooth feel of a coating film formed from the coating composition; whereas the number average particle diameter of more than 40 μm may generate a rough feel and lose the smooth feel. The resin particles more preferably have a number average particle diameter of 4 to 20 μm.

Here, the number average particle diameter of the resin particles (C) was measured using a laser diffraction-type particle size distribution measuring apparatus.

The water-based one-pack-type coating composition of the present invention further contains the urethane dispersion (D) The urethane dispersion (D) used together with the above (A) and (B) is a component which is dissolved by heat-flow to form a matrix together with the (A) and (B). By adding the urethane dispersion (D), effects of a soft feel and abrasion resistance are achieved.

As the urethane dispersion (D), commercially available products can also be used. The commercially available urethane dispersion is not particularly limited, and examples thereof include urethane dispersion VP LS 2952 (produced by Sumika Bayer Urethane Co., Ltd.), urethane dispersion HUX-561 (produced by ADEKA Corporation), NeoRez R 9603 (produced by DSM N.V.), and the like.

In the water-based one-pack-type coating composition of the present invention, the amount of the resin particles (C) is 40 to 100 parts by mass with respect to 100 parts by mass of the total solid content of the ionomer resin emulsion (A), the polyolefin resin emulsion (B), and the urethane dispersion (D). That is, the solid content mass ratio (mass ratio as converted into a solid content) of (C)/{(A)+(B)+(D)} is 40/100 to 100/100. The amount of the resin particles (C) of less than 40 parts by mass deteriorates the matt appearance and the smooth feel of a coating film formed from the coating composition are poor; whereas the amount of the resin particles (C) of more than 100 parts by mass generates a rough feel and loses the smooth feel.

Further, the solid content mass ratio of {(A)+(B)}/(D) is 40/60 to 70/30. The mass ratio of less than 40/60 deteriorates the adhesion property and the oil and grease resistance; whereas the mass ratio of more than 70/30 deteriorates the soft feel and the abrasion resistance.

The water-based one-pack-type coating composition of the present invention may be a color paint or a clear paint. When it is the color paint, various pigments such as a color pigment, bright pigments, and extender pigments can be mixed. Examples of the color pigments include organic pigments such as azo lake pigments, insoluble azo pigments, condensation azo pigments, phthalocyanine pigments, indigo pigments, perynone pigments, perylene pigments, phthalone pigments, dioxazine pigments, quinacridone pigments, isoindolinone pigments, benzoimidazolone pigments, diketopyrrolopyrrole pigments, and metal complex pigments, and inorganic pigments such as yellow iron oxide, iron oxide red, carbon black, and titanium dioxide. Examples of the bright pigments include flake pigments consisting of cholesteric liquid crystal polymer, aluminum flake pigments, alumina flake pigments coated with metal oxide, silica flake pigments coated with metal oxide, graphite pigments, interference mica pigments, color mica pigments, metal titanium flake pigments, stainless flake pigments, plate iron oxide pigments, metal-plated glass flake pigments, metal oxide-plated glass flake pigments, hologram pigments, and the like. Examples of the extender pigments include barium sulfate, talc, kaoline, silicates, and the like. The pigments can be generally used in a state of being dispersed in a coating composition as pigment paste. The pigment paste can be generally prepared by adding a pigment and a resin to a solvent and dispersing them in the solvent. Further, commercially available pigment paste can also be used. The resin is not particularly limited, and examples of the resin include water-soluble resins such as acrylic polyol, polyester polyol, and polyacrylic acid. The solvent is not particularly limited, and examples of the solvent include organic solvents such as xylene and water. For dispersing a resin, equipment such as a sand grinder mill is generally used.

The water-based one-pack-type coating composition of the present invention may contain other substances to be mixed as required within bounds which do not impair the effects of the present invention. Substances to be mixed, which the water-based coating composition of the present invention can contain, are not particularly limited, and it is acceptable to add, for example, resin emulsions other than the (A), (B), (C) and (D), surface control agents, anti-setting agents, matting agents, ultraviolet absorbers, light stabilizers, antioxidants, slip agents, film formation aids, crosslinking agents, thickening agents, antifoaming agents, and the like.

The coating composition of the present invention can be used for various base materials, such as plastic, metal, glass, and foam, and molded articles thereof, but it can be suitably used particularly for molded articles of plastics such as polypropylene, an ABS resin, and polycarbonate. Specific examples of these plastics include automotive interior parts such as instrument panels, center consoles, and door trims; light electrical appliance parts such as housings of radio-cassette tape recorders and computers; building interior materials such as wall materials, floor materials, and ceiling materials.

When coating is carried out using the coating composition of the present invention, it is not necessary to coat a base material with a primer prior to coating. Generally, after wiping the base material clean with alcohol, etc., the coating composition of the present invention can be applied directly to the base material and dried to form a coating film. It is also possible to apply the coating composition of the present invention to a base material coated with a primer.

A method of applying the coating composition of the present invention to the base material is not particularly limited, and examples of the method include spray coating, roll coating, bell coating, disk coating, brush coating, and the like. It is ordinarily possible to paint the coating composition so as to have a dried film thickness of 15 µm (lower limit) to 50 µm (upper limit). The coating composition may be set by leaving it at rest at normal temperature (room temperature) for an appropriate period of time between the coating and the drying/forming of a coating film.

The drying may be performed at normal temperature (room temperature) or by heating. Further, even when drying is performed by heating, drying can be performed by heating at low temperatures because it is not necessary to initiate a curing reaction and it is only necessary to dissolve the surface of the resin and to allow the resin to adhere to the base material. This heating can be performed, for example, at 60 to 120° C. for 5 to 60 minutes. The drying and forming a coating film may be performed simultaneously.

In addition, the coated article obtained by coating described above also constitutes the present invention.

EFFECTS OF THE INVENTION

The water-based one-pack-type coating composition of the present invention has a constitution described above and is excellent in that the water-based one-pack-type can be realized without impairing properties as paint. Further, the resulting coating film has a satisfactory feel superior in both a soft feel and coating film performance, and further is excellent in common performance of paint such as excellent design (a matt appearance, etc.), an adhesion property, coating film strength, abrasion resistance, water resistance, oil and grease-contamination resistance and alkali resistance. The coated article of the present invention has a coating film formed from a water-based one-pack-type coating composition and has an excellent feel and appearance.

BEST MODE FOR CARRYING OUT THE INVENTION

Hereinafter, the present invention will be described in more detail by way of Examples, but the present invention is not limited to these Examples. In addition, "part(s)" refers to "part (s) by weight" in Examples, unless otherwise specified.

Synthesis Example of Ionomer Resin Emulsion (A)
A1

An amount of 150 g of ion-exchange water was charged into a 1 liter of four necked flask equipped with a Dimroth condenser, a temperature controller, a stirring blade, and a dropping funnel, and heated to 80° C. in an atmosphere of nitrogen. Thereto, 30.0 g of a metal salt of an acid group-containing vinyl monomer (SR708, produced by Sartomer Company, Inc.), 15.18 g of n-butyl acrylate, 54.82 g of n-butyl methacrylate, an emulsified liquid, which is prepared by adjusting 5.00 g of HS-10 (produced by Daiichi Kogyo Seiyaku Co., Ltd.) as an emulsifier with 83.5 g of ion-exchange water, and 13.33 g of a 2.91% aqueous solution of an initiator APS (ammonium peroxodisulfate, produced by KISHIDA CHEMICAL Co., Ltd.) were added dropwise over 3 hours in an atmosphere of nitrogen. The resulting mixture was aged for 1 hour, and to this mixture, 3.33 g of the 2.91% aqueous solution of APS was added dropwise over 30 minutes, and the resulting mixture was aged for 2 hours to obtain the desired acrylic emulsion. The nonvolatile content of the emulsion was 29.8%.

Ionomer resin emulsions (A) A2 to A9 were prepared in the same method as in Synthesis Example of the acrylic emulsion A1 except for changing composition ratios as shown in Tables 1 and 2 below.

TABLE 1

| | | Resin number | | | | |
|---|---|---|---|---|---|---|
| | | A1 | A2 | A3 | A4 | A5 |
| Ion-exchange water | | 150.00 (0) | 150.00 (0) | 150.00 (0) | 150.00 (0) | 150.00 (0) |
| Emulsifier | | 88.50 (5) | 88.50 (5) | 88.50 (5) | 88.50 (5) | 88.50 (5) |
| Metal salt of acid | SR708 | 30.00 (30.00) | | | 22.00 (22.00) | 45.00 (45.00) |
| group-containing | CN2405 | | 30.00 (30.00) | | | |
| vinyl monomer | Formula (4) | | | | | 30.00 (30.00) |
| N-butyl acrylate | | 15.18 (15.176) | 15.176 (15.176) | 16.91 (16.91) | 11.92 (11.924) | 27.38 (27.38) |
| N-butyl methacrylate | | 54.82 (54.82) | 54.82 (54.82) | 61.08 (61.08) | 43.08 (43.076) | 42.63 (42.63) |
| Methyl methacrylate (MMA) | | | | | | |
| Initiator (before aging)[1] | | 13.33 (0.39) | 13.33 (0.39) | 13.33 (0.39) | 13.33 (0.39) | 13.33 (0.39) |
| Initiator (after aging)[1] | | 3.33 (0.10) | 3.33 (0.10) | 3.33 (0.10) | 3.33 (0.10) | 3.33 (0.10) |
| Subtotal | | 355.2 (105.5) | 355.2 (105.5) | 355.1 (105.5) | 355.2 (105.5) | 355.2 (105.5) |
| Amount of emulsion obtained | | 355.2 | 355.2 | 355.1 | 355.2 | 355.2 |
| Calculated NV | | 29.7 | 29.7 | 29.7 | 29.7 | 29.7 |
| Percentage of metal salt of acid group-containing vinyl monomer in 100% of monomer (%) | | 30.0 | 30.0 | 22.0 | 45.0 | 30.0 |
| Nonvolatile content in emulsion | | 29.8 | 30.2 | 30.0 | 30.0 | 30.4 |
| Tg (° C.) | | 0 | 0 | 0 | 0 | −28.9 |

Note
[1]Initiator: ammonium peroxodisulfate

TABLE 2

| | | Resin number | | | |
|---|---|---|---|---|---|
| | | A6 | A7 | A8 | A9 |
| Ion-exchange water | | 150.00 (0) | 150.00 (0) | 150.00 (0) | 150.00 (0) |
| Emulsifier | | 88.50 (5) | 88.50 (5) | 88.50 (5) | 88.50 (5) |
| Metal salt of acid group-containing vinyl monomer | SR708 | | | 10.00 (10.00) | 55.00 (55.00) |
| | CN2405 | | | | |
| | Formula (4) | 30.00 (30.00) | 30.00 (30.00) | | |
| N-butyl acrylate | | 15.18 (15.18) | 62.68 (62.68) | 19.517 (19.517) | 9.756 (9.756) |
| N-butyl methacrylate | | 54.82 (54.82) | 7.32 (7.32) | 70.49 (70.49) | 35.24 (35.24) |
| Methyl methacrylate (MMA) | | | | | |
| Initiator (before aging)[1] | | 13.33 (0.39) | 13.33 (0.39) | 13.33 (0.39) | 13.33 (0.39) |
| Initiator (after aging)[1] | | 3.33 (0.10) | 3.33 (0.10) | 3.33 (0.10) | 3.33 (0.10) |
| Subtotal | | 355.2 (105.5) | 355.2 (105.5) | 355.16 (105.51) | 355.155 (105.5) |
| Amount of emulsion obtained | | 355.2 | 355.2 | 355.16 | 355.16 |
| Calculated NV | | 29.7 | 29.7 | 29.7 | 29.7 |
| Percentage of metal salt of acid group-containing vinyl monomer in 100% of monomer (%) | | 30.0 | 30.0 | 10.0 | 55.0 |
| Nonvolatile content in emulsion | | 30.3 | 29.7 | 30.1 | 29.7 |
| Tg (° C.) | | 2.2 | 10 | 0 | 0 |

In Tables 1 and 2 shown above, the actual measurements of Tg are made according to the following steps using a differential scanning calorimeter (DSC) (thermal analyzer SSC 5200H manufactured by Seiko Instruments Inc.) after distilling off a solvent of the obtained emulsion under reduced pressure.

Measurement was performed under the conditions of a first step: 20° C. to 100° C. (temperature raising rate 10° C./min), a second step: 100° C. to −50° C. (temperature lowering rate 10° C./min), and a third step: −50° C. to 100° C. (temperature raising rate 10° C./min), and Tg was determined from the measurements in raising temperature in the third step.

In Tables 1 and 2 shown above, SR708 and CN2045 of the acid group-containing vinyl monomers are produced by Sartomer Company, Inc., and have the following chemical structure, respectively.

SR708: zinc dimethacrylate

CN2405: compound expressed by the following formula (3):

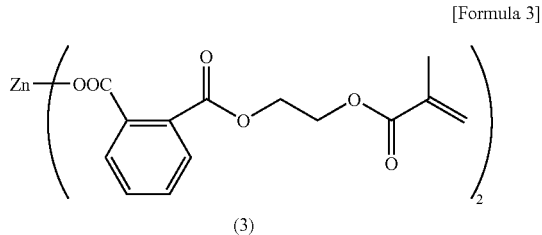

(3)

[Formula 3]

Furthermore, formula (4) in Tables is a compound expressed by the following formula (4).

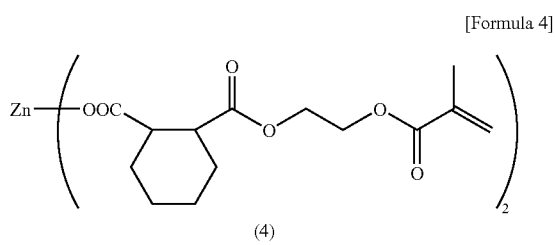

(4)

[Formula 4]

Synthesis of Acid Anhydride Modified Nonchlorinated Polyolefin Resin Emulsion B1

In a four necked flask equipped with a stirrer, a condenser, a thermometer, and a dropping funnel, 300 g of a propylene-α-olefin copolymer (propylene component: 75 mol %, ethylene component: 20 mol %, 1-butene component: 6 mol %, number average molecular weight: 25000) was dissolved in 700 g of toluene through heating, and 13 g of maleic anhydride and 12 g of di-t-butyl peroxide as a radical generator were each added dropwise over 2 hours while keeping a system temperature at 115° C. and stirring the contents, and the resulting mixture was aged for 3 hours. After a reaction, a reactant was cooled to room temperature and then was added to 20 liter of acetone to be purified to obtain a graft copolymer (average molecular weight: 18500) of maleic anhydride with the amount of grafting being 2.1% by weight.

Into a reactor equipped with a stirrer, a thermometer, a condenser, and a dropping funnel, 100 parts by mass of a modified polyolefin resin was charged and dissolved through heating at 1200, and then 6 parts of morpholine was added as a basic material while stirring the resulting mixture, and further 40 parts of polyethyleneoxide was added as a surface-active component. After stirring the mixture until it became homogeneous, 600 parts of water was added little by little to obtain a water-based product through phase inversion. A pH of the water-based product was adjusted to 6 to 8, and then agglomerated substances having a particle size of 100 μm or more were removed by filtration to obtain an acid anhydride modified nonchlorinated polyolefin resin emulsion B1 (solid content: 16%).

Synthesis of Acid Anhydride Modified Chlorinated Polyolefin Resin Emulsion B2

Into a reaction apparatus equipped with a stirring blade, a condenser, a thermometer, and a temperature control unit, 100 parts of acid anhydride modified chlorinated polyolefin resin (nonvolatile content: 100%, chlorine content: 22%, amount of maleic acid modified portion: 3%, weight average molecular weight: 70000) and 40 parts of xylene were charged, and an internal temperature was raised to 80° C. to dissolve the polyolefin resin in the flask, and 1 hour after this dissolution, an aqueous solution of 70° C. composed of 15 parts by mass of a surfactant EMULGEN 920 (produced by KAO Corporation), 2 parts of dimethylethanolamine and 265 parts by mass of pure water was added dropwise over 1 hour while keeping the internal temperature at 80° C. and stirring the contents of a reaction vessel. The resulting mixture was cooled to room temperature to obtain an acid anhydride modified chlorinated polyolefin resin emulsion B2. The nonvolatile content of this resin was 30%.

EXAMPLE 1

An amount of 67.11 g of the acrylic emulsion (A1), 128.2 g of HUX-561 (produced by ADEKA Corporation) as the urethane dispersion (D), and 100.00 g of the acid anhydride modified chlorinated polyolefin resin emulsion (B2) were charged into a container in turn and dispersed uniformly, and then 18.46 g of pigment paste DE-15070 (produced by Rohm & Haas Co.), 3.00 g of POLYFLOW KL245 (produced by Kyoeisha Chemical Co., Ltd.) as a leveling agent, Surfonol 104PA (produced by Air Products and Chemicals, Inc.) as an antifoaming agent, and 10.00 g of NMP (Kuraray Co., Ltd.) as a film formation aid were added. Next, 60.00 g of resin particles P800T (produced by Negami Chemical Industrial Co., Ltd.) (C1) was added gradually and dispersed uniformly. As a thickening agent, 7.50 g of ASE-60 (produced by Rohm &Haas Co.) and 25.00 g of ion-exchange water were added.

EXAMPLES 2 TO 10, COMPARATIVE EXAMPLES 1 TO 7

Coating compositions were prepared in the same manner as in Example 1 except for changing the material composition as shown in Tables 3 to 5.

TABLE 3

Formulation of paint and their factor/level

| Raw material name | | Example 1 | Example 2 | Example 3 | Example 4 | Example 5 |
|---|---|---|---|---|---|---|
| Ionomer resin emulsion (A) | A1 | 67.11 (20.00) | | 67.11 (20.00) | | |
| | A2 | | 66.22 (20.00) | | | |
| | A3 | | | | 66.66 (20.00) | |
| | A4 | | | | | 65.80 (20.00) |
| Polyolefin resin emulsion (B) | Nonchlorinated B1 | | | 187.5 (30.00) | | |
| | Chlorinated B2 | 100.00 (30.00) | 100.00 (30.00) | | 100.00 (30.00) | 100.00 (30.00) |
| Resin particle (C) | Urethane C1 | 60.00 (60.00) | | | | |
| | Acryl C2 | | 60.00 (60.00) | 60.00 (60.00) | 60.00 (60.00) | 60.00 (60.00) |
| Urethane dispersion (D) | | 128.2 (50.00) | 128.2 (50.00) | 128.2 (50.00) | 128.2 (50.00) | 128.2 (50.00) |
| (C)/(A) + (B) + (D) (solid matter ratio) | | 60/100 | 60/100 | 60/100 | 60/100 | 60/100 |
| (A)/(B) (solid matter ratio) | | 20/30 | 20/30 | 20/30 | 20/30 | 20/30 |
| (A) + (B)/(D) (solid matter ratio) | | 1 | 1 | 1 | 1 | 1 |
| Antifoaming agent (Surfonol 104PA) | | 3.00 (1.50) | 3.00 (1.50) | 3.00 (1.50) | 3.00 (1.50) | 3.00 (1.50) |
| Leveling agent (POLYFLOW KL245) | | 3.00 (3.00) | 3.00 (3.00) | 3.00 (3.00) | 3.00 (3.00) | 3.00 (3.00) |
| Pigment (DE-15070 Paste) | | 18.46 (8.64) | 18.46 (8.64) | 18.46 (8.64) | 18.46 (8.64) | 18.46 (8.64) |
| Film formation aid (NMP) | | 10.00 (0) | 10.00 (0) | 10.00 (0) | 10.00 (0) | 10.00 (0) |
| Thickening agent (ASE-60) | | 7.50 (3.00) | 7.50 (3.00) | 7.50 (3.00) | 7.50 (3.00) | 7.50 (3.00) |
| Ion-exchange water | | 25.00 (25.00) | 25.00 (25.00) | 25.00 (25.00) | 25.00 (25.00) | 25.00 (25.00) |
| Total | | 422.27 (176.14) | 421.38 (176.14) | 484.77 (176.14) | 421.82 (176.14) | 420.95 (176.14) |
| Solid content (%) | | 41.7 | 41.8 | 36.3 | 41.8 | 41.8 |

TABLE 4

| Raw material name | | Example 6 | Example 7 | Example 8 | Example 9 | Example 10 |
|---|---|---|---|---|---|---|
| Ionomer resin emulsion (A) | A5 | 65.79 (20.0) | | | | |
| | A6 | | 66.00 (20.00) | | 111.11 (33.00) | 79.207 (24.00) |
| | A7 | | | 94.276 (28.00) | | |
| | A8 | | | | | |
| | A9 | | | | | |
| Polyolefin resin emulsion (B) | Nonchlorinated B1 | | | 137.50 (22.00) | 106.25 (17.00) | 225.00 (36.00) |
| | Chlorinated B2 | 100.00 (30.00) | 100.00 (30) | | | |
| Resin particle (C) | Urethane C1 | | 60.00 (60.00) | 60.00 (60.00) | 60.00 (60.00) | 30.00 (30.00) |
| | Acryl C2 | 90.00 (90.00) | | | | 30.00 (30.00) |
| Urethane dispersion (D) | | 128.20 (50.00) | 128.20 (50.00) | 128.20 (50.00) | 128.20 (50.00) | 102.56 (40.00) |
| (C)/(A) + (B) + (D) (solid matter ratio) | | 90/100 | 60/100 | 60/100 | 60/100 | 60/90 |
| (A)/(B) (solid matter ratio) | | 20/30 | 20/30 | 28/22 | 33/17 | 20/30 |
| (A) + (B)/(D) (solid matter ratio) | | 1 | 1 | 1 | 1 | 60/40 |
| Antifoaming agent (Surfonol 104PA) | | 3.00 (1.50) | 3.00 (1.50) | 3.00 (1.50) | 3.00 (1.50) | 3.00 (1.50) |
| Leveling agent (POLYFLOW KL245) | | 3.00 (3.00) | 3.00 (3.00) | 3.00 (3.00) | 3.00 (3.00) | 3.00 (3.00) |
| Pigment (DE-15070 Paste) | | 18.46 (8.64) | 18.46 (8.64) | 18.46 (8.64) | 18.46 (8.64) | 18.46 (8.64) |
| Film formation aid (NMP) | | 10.00 (0) | 10.00 (0) | 10.00 (0) | 10.00 (0) | 10.00 (0) |
| Thickening agent (ASE-60) | | 7.50 (3.00) | 7.50 (3.00) | 7.50 (3.00) | 7.50 (3.00) | 7.50 (3.00) |
| Ion-exchange water | | 25.00 (0.00) | 25.00 (0.00) | 0.00 (0.00) | 0.00 (0.00) | 0.00 (0.00) |
| Total | | 450.95 (206.14) | 421.16 (176.14) | 461.94 (176.14) | 447.52 (176.14) | 508.73 (176.14) |
| Solid content (%) | | 45.7 | 41.8 | 38.1 | 39.4 | 34.6 |

TABLE 5

| | | | | | | |
|---|---|---|---|---|---|---|
| Raw material name | | | Comparative Example 1 | Comparative Example 2 | Comparative Example 3 | Comparative Example 4 |
| Ionomer resin emulsion (A) | A1 | | 67.11 (20.00) | | 199.34 (60.00) | 19.93 (6.00) |
| | A2 | | | | | |
| | A3 | | | | | |
| | A4 | | | | | |
| | A5 | | | | | |
| | A6 | | | 66.01 (20) | | |
| | A7 | | | | | |
| | A8 | | | | | |
| | A9 | | | | | |
| Polyolefin resin emulsion (B) | Nonchlorinated B1 | | | | | |
| | Chlorinated B2 | | 100.00 (30.00) | 100.00 (30.00) | 50.00 (15.00) | 80.00 (24.00) |
| Resin particle (C) | Urethane C1 | | | | | |
| | Acryl C2 | | 20.00 (20.00) | 110.00 (110.00) | 60.00 (60.00) | 60.00 (60.00) |
| Urethane dispersion (D) | | | 128.20 (50.00) | 128.2 (50.00) | 64.10 (25.00) | 179.49 (70.00) |
| (C)/(A) + (B) + (D) (solid matter ratio) | | | 20/100 | 110/100 | 60/100 | 60/100 |
| (A)/(B) (solid matter ratio) | | | 20/30 | 20/30 | 4 | 10/40 |
| (A) + (B)/(D) (solid matter ratio) | | | 50/50 | 1 | 3 | 30/70 |
| Antifoaming agent (Surfonol 104PA) | | | 3.00 (1.50) | 3.00 (1.50) | 3.00 (1.50) | 3.00 (1.50) |
| Leveling agent (POLYFLOW KL245) | | | 3.00 (3.00) | 3.00 (3.00) | 3.00 (3.00) | 3.00 (3.00) |
| Pigment (DE-15070 Paste) | | | 18.46 (8.64) | 18.46 (8.64) | 18.46 (8.64) | 18.46 (8.64) |
| Film formation aid (NMP) | | | 10.00 (0) | 10.00 (0) | 10.00 (0) | 10.00 (0) |
| Thickening agent (ASE-60) | | | 7.50 (3.00) | 7.50 (3.00) | 7.50 (3.00) | 7.50 (3.00) |
| Ion-exchange water | | | 25.00 (0.00) | 25.00 (0.00) | 25.00 (0.00) | 25.00 (0.00) |
| Total | | | 382.27 (136.14) | 471.17 (226.14) | 440.40 (176.14) | 406.48 (176.14) |
| Solid content (%) | | | 35.6 | 48.0 | 40.0 | 43.3 |

| Raw material name | | | Comparative Example 5 | Comparative Example 6 | Comparative Example 7 |
|---|---|---|---|---|---|
| Ionomer resin emulsion (A) | A1 | | 43.19 (13.00) | 25 (7.5) | 33.33 (10) |
| | A2 | | | | |
| | A3 | | | | |
| | A4 | | | | |
| | A5 | | | | |
| | A6 | | | | |
| | A7 | | | | |
| | A8 | | | | |
| | A9 | | | | |
| Polyolefin resin emulsion (B) | Nonchlorinated B1 | | | | |
| | Chlorinated B2 | | 183.33 (55.00) | 141.67 (42.5) | 50.00 (15.00) |
| Resin particle (C) | Urethane C1 | | | 60.00 (60.00) | 60.00 (60.00) |
| | Acryl C2 | | 60.00 (60.00) | | |
| Urethane dispersion (D) | | | 82.05 (32.00) | 128.20 (50.00) | 192.31 (75.00) |
| (C)/(A) + (B) + (D) (solid matter ratio) | | | 60/100 | 60/100 | 60/100 |
| (A)/(B) (solid matter ratio) | | | 0.24/1 | 15/85 | 20/30 |
| (A) + (B)/(D) (solid matter ratio) | | | 68/32 | 50/50 | 25/75 |
| Antifoaming agent (Surfonol 104PA) | | | 3.00 (1.50) | 3.00 (1.50) | 3.00 (1.50) |
| Leveling agent (POLYFLOW KL245) | | | 3.00 (3.00) | 3.00 (3.00) | 3.00 (3.00) |
| Pigment (DE-15070 Paste) | | | 18.46 (8.64) | 18.46 (8.64) | 18.46 (8.64) |
| Film formation aid (NMP) | | | 10.00 (0) | 10.00 (0) | 10.00 (0) |
| Thickening agent (ASE-60) | | | 7.50 (3.00) | 7.50 (3.00) | 7.50 (3.00) |
| Ion-exchange water | | | 25.00 (0.00) | 25.00 (0.00) | 25.00 (0.00) |
| Total | | | 435.48 (176.14) | 421.83 (176.14) | 402.6 (176.14) |
| Solid content (%) | | | 40.4 | 41.8 | 43.8 |

Preparation of Test Piece

<Coating Method>

The obtained coating composition was applied by spray to a polypropylene material, and left standing at room temperature for 5 minutes, and baked at 80° C. for 20 minutes to obtain a test piece having a dried film thickness of 30 μm and a size of 100 mm×100 mm×3 mm.

The test pieces obtained in the above Examples were evaluated according to the following criteria. Tables 6 and 7 show the results of the evaluations.

Evaluation of Coating Film Performance

<Adhesion>

Longitudinal and lateral slits of 2 mm in width were cut on a coating film with a cutter and 100 lattices were formed, and an adhesive tape was stuck thereon, and one end of the tape was pulled up and peeled off. This peeling motion was repeated three times at one point. The number of square lattices in which a coating film within a lattice was peeled by 50% or more of an area of the lattice was evaluated. When the number of lattices peeled is 0, the coating film is rated as satisfactory (○), and when this number of lattices is 1 or more, the coating film is rated as bad (x).

<Water Resistance>

A cylindrical ring was attached to the surface of the coating film, and 5 ml of distilled water was poured in the ring and a glass plate was placed thereon as a lid, and the coating film was left standing at 55° C. 4 hours. Thereafter, the coating film was washed with water and the surface of the coating film was observed.

○: There is no defect such as stain or blister on the surface of the coating film.

x: There are defects such as stain or blister on the surface of the coating film.

<Alkali Resistance>

A cylindrical ring was attached to the surface of the coating film, and 5 ml of a 0.1N aqueous solution of sodium hydroxide was poured in the ring and a glass plate was placed thereon as a lid, and the coating film was left standing at 55° C. 4 hours. Thereafter, the coating film was washed with water and the surface of the coating film was observed.

○: There is no defect such as stain or blister on the surface of the coating film.

x: There are defects such as stain or blister on the surface of the coating film.

<Oil and Grease Resistance>

An amount of 2 g/100 cm$^2$ of beef tallow (reagent) was applied to the surface of the test piece of the hardened coating film and spread uniformly, and the test piece was left standing in a sealed container of 80° C. for 7 days. Thereafter, the test piece was taken out, and its surface was visually observed for evaluation according to the following criteria.

○: There is no defect such as stain or blister on the surface of the coating film.

x: There are defects such as stain or blister on the surface of the coating film.

<Abrasion Resistance>

A rubbing test was performed under the conditions of a load of 2 kg/cm$^2$, five thicknesses of gauze on a rubbing element, the number of rubbings of 20 to-and-fro movements, a rubbing speed of 30 to-and-fro movements/min ○: There is no significant abrasion, fading, or exposure of a substrate.

x: There are significant abrasions, fadings and exposures of a substrate.

<Elastic Feel>

An elastic deformation rate (elastic recovery rate) of the coating film which is derived from Fischer hardness tester manufactured by Fischer Instrument K.K. was determined to judge an elastic feel. Measurement was performed under the following conditions and an elastic coating film in which the elastic deformation rate (elastic recovery rate) is 50% or more was rated as a satisfactory feel (○) and a coating film in which the elastic deformation rate (elastic recovery rate) is less than 50% was rated as a bad feel (x). Measurement was performed under the following conditions.

Load: 40 mN, creep: 0.5 s, unloading: 0.4 mN/6 s

<Coating Film Strength>

Hardness of the coating film which is derived from a Fischer hardness tester manufactured by Fischer Instrument K.K. was measured. Measurement was performed under the following conditions.

Load: 40 mN, creep: 0.5 s, unloading: 0.4 mN/6 s

○: Soft coating film in which hardness is 5.0 N/mm$^2$ or less x: Hard coating film in which hardness is more than 5.0 N/mm$^2$ Evaluation of Feel <Moist Feel>

Feel in touching the sample with fingers was evaluated according to the following criteria.

○: There is a moderate moist feel in touching the test piece with hand.

x: There is not a moderate moist feel in touching the test piece with hand, and there is a tacky feel.

<Smooth Feel>

Feel in touching the sample with fingers was evaluated according to the following criteria.

○: There is a moderate smooth feel in touching the test piece with hand.

x: There is not a moderate smooth feel in touching the test piece with hand.

<Moist Feel and Smooth Feel>

The moist feel and smooth feel were comprehensively evaluated, and the case where both feels are satisfactory was rated as satisfactory (○) and the case where either of these feels is bad was rated as bad (x).

<Comprehensive Feel>

The above elastic feel, coating film hardness, moist feel and smooth feel were comprehensively evaluated, and the case where all items are satisfactory was rated as ○ and the case where either of these items is bad was rated as x.

TABLE 6

| | | Results of performance | | | | | | | | | |
|---|---|---|---|---|---|---|---|---|---|---|---|
| | | Example 1 | Example 2 | Example 3 | Example 4 | Example 5 | Example 6 | Example 7 | Example 8 | Example 9 | Example 10 |
| Coating film performance | Adhesion property | ○ | ○ | ○ | ○ | ○ | ○ | ○ | ○ | ○ | ○ |
| | Water resistance | ○ | ○ | ○ | ○ | ○ | ○ | ○ | ○ | ○ | ○ |
| | Alkali resistance | ○ | ○ | ○ | ○ | ○ | ○ | ○ | ○ | ○ | ○ |
| | Oil and grease resistance | ○ | ○ | ○ | ○ | ○ | ○ | ○ | ○ | ○ | ○ |
| | Abrasion resistance | ○ | ○ | ○ | ○ | ○ | ○ | ○ | ○ | ○ | ○ |
| Soft feel | Elastic feel (%) | ○61 | ○58 | ○57 | ○57 | ○53 | ○62 | ○63 | ○60 | ○60 | ○54 |
| | Coating film hardness (N/mm$^2$) | ○3.2 | ○4.0 | ○4.1 | ○3.7 | ○3.0 | ○3.5 | ○3.9 | ○4.3 | ○3.3 | ○3.2 |
| | Moist feel | ○ | ○ | ○ | ○ | ○ | ○ | ○ | ○ | ○ | ○ |
| | Smooth feel | ○ | ○ | ○ | ○ | ○ | ○ | ○ | ○ | ○ | ○ |
| | Moist feel and smooth feel | ○ | ○ | ○ | ○ | ○ | ○ | ○ | ○ | ○ | ○ |
| | Comprehensive feel | ○ | ○ | ○ | ○ | ○ | ○ | ○ | ○ | ○ | ○ |
| Comprehensive evaluation (Coating film properties/Soft feel) | | ○ | ○ | ○ | ○ | ○ | ○ | ○ | ○ | ○ | ○ |

TABLE 7

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Coating film performance | Adhesion property | ○ | x | ○ | ○ | ○ | ○ | x |
|  | Water resistance | ○ | x | x | x | x | x | ○ |
|  | Alkali resistance | ○ | x | x | x | x | x | ○ |
|  | Oil and grease resistance | ○ | x | ○ | x | x | x | x |
|  | Abrasion resistance | x | ○ | ○ | x | x | x | ○ |
| Soft feel | Elastic feel (%) | ○54 | ○60 | x38 | ○63 | x40 | ○52 | ○58 |
|  | Coating film hardness (N/mm$^2$) | ○2.9 | ○3.5 | ○3.8 | ○4.1 | ○2.1 | ○2.3 | ○2.5 |
|  | Moist feel | x | ○ | ○ | x | x | ○ | ○ |
|  | Smooth feel | x | x | ○ | ○ | ○ | ○ | ○ |
|  | Moist feel and smooth feel | x | x | ○ | ○ | x | ○ | ○ |
|  | Comprehensive feel | x | x | ○ | x | x | ○ | ○ |
| Comprehensive evaluation (Coating film properties/Soft feel) |  | x | x | x | x | x | x | x |

Tables 6 and 7 illustrated above indicate that the water-based one-pack-type coating composition of the present invention is superior in all performance such as a soft feel and coating film performance in spite of being the water-based one-pack-type paint, but the water-based one-pack-type coating composition of Comparative Example is not suitable for practical use because it is impossible to simultaneously achieve the soft feel and coating film performance.

INDUSTRIAL APPLICABILITY

The water-based one-pack-type coating composition of the present invention can be suitably used for coating of automotive interior parts such as instrument panels, center consoles, and door trims, light electrical appliance parts such as housings of radio-cassette tape recorders and computers, and building interior materials such as wall materials, floor materials, and ceiling materials. The coated article of the present invention can be easily manufactured and can be used as automotive interior parts, light electrical appliance parts and building interior materials which have an excellent feel.

The invention claimed is:

1. A water-based one-pack-type coating composition comprising:
    an ionomer resin emulsion (A),
    a polyolefin resin emulsion (B),
    resin particles (C), and
    a urethane dispersion (D),
    wherein a solid content mass ratio (mass ratio as converted into a solid content) of (C)/{(A)+(B)+(D)} is 40/100 to 100/100,
    a solid content mass ratio of (A)/(B) is 1/3 to 3/1, and
    a solid content mass ratio of {(A)+(B)}/(D) is 40/60 to 70/30,
    wherein the ionomer resin is an acrylic resin having an intermolecular bond, wherein the intermolecular bond is formed by acid groups crosslinked through a metal ion.

2. The water-based one-pack-type coating composition according to claim 1, wherein said ionomer resin emulsion (A) has a glass transition temperature (Tg) of −40 to 20° C.

3. The water-based one-pack-type coating composition according to claim 1 or 2, wherein said polyolefin resin emulsion (B) comprises at least one of an acid anhydride modified chlorinated polyolefin and an acid anhydride modified non-chlorinated polyolefin.

4. The water-based one-pack-type coating composition according to claim 1, wherein said resin particles (C) have a number average particle diameter of 2 to 40 μm, as measured using a laser diffraction-type particle size distribution measuring apparatus.

5. A coated article comprising a coating film formed on its surface, wherein said coating film is formed from the water-based one-pack-type coating composition according to claim 1.

6. A water-based one-pack-type coating composition comprising:
    an ionomer resin emulsion (A),
    a polyolefin resin emulsion (B),
    resin particles (C), and
    a urethane dispersion (D),
    wherein a solid content mass ratio (mass ratio as converted into a solid content) of (C)/{(A)+(B)+(D)} is 40/100 to 100/100,
    a solid content mass ratio of (A)/(B) is 1/3 to 3/1, and
    a solid content mass ratio of {(A)+(B)}/(D) is 40/60 to 70/30,
    wherein the ionomer resin emulsion (A) comprises an acrylic resin having an intermolecular bond by metal ions.

7. The water-based one-pack-type coating composition according to claim 6, wherein the intermolecular bond of the ionomer resin (A) is at least one selected from the group consisting of Zn, Mg, Ca, and Al.

8. A water-based one-pack-type coating composition comprising:
    an ionomer resin emulsion (A),
    a polyolefin resin emulsion (B),
    resin particles (C), and
    a urethane dispersion (D),
    wherein a solid content mass ratio (mass ratio as converted into a solid content) of (C)/{(A)+(B)+(D)} is 40/100 to 100/100,
    a solid content mass ratio of (A)/(B) is 1/3 to 3/1, and
    a solid content mass ratio of {(A)+(B)}/(D) is 40/60 to 70/30,
    wherein the ionomer resin emulsion (A) comprises at least one intermolecularly bonded acrylic resin comprising reacted monomer units selected from the group consisting of:

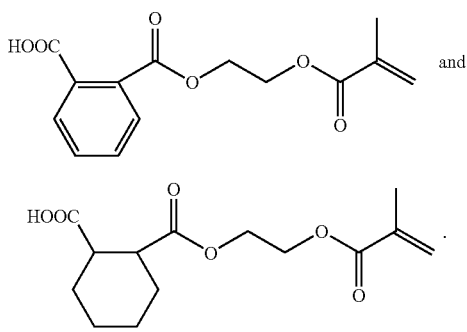

9. The water-based one-pack-type coating composition according to claim 1, wherein the ionomer resin emulsion (A) is an intermolecularly bonded acrylic resin, and the polyolefin resin emulsion (B) is an acid anhydride modified non-chlorinated polyolefin resin emulsion.

10. The water-based one-pack-type coating composition according to claim 1, wherein the polyolefin resin emulsion (B) is an acid anhydride modified chlorinated polyolefin resin emulsion.

11. The water-based one-pack-type coating composition according to claim 8, wherein the ionomer resin emulsion (A) comprises at least one resin comprising polymerized monomer units including n-butyl acrylate, n-butyl methacrylate, and methyl methacrylate.

12. The water-based one-pack-type coating composition of claim 1, wherein (C)/{(A)+(B)+(D)} is 60:100-90:100.

13. The water-based one-pack-type coating composition according to claim 1, wherein (A)/(B) is 20:30-33:17.

14. The water-based one-pack-type coating composition according to claim 1, wherein {(A)+(B)}/(D) is 60:40-1:1.

* * * * *